United States Patent [19]
Yamauchi et al.

[11] Patent Number: 5,147,107
[45] Date of Patent: Sep. 15, 1992

[54] SUN ROOF DEVICE

[75] Inventors: Nobuhiro Yamauchi, Kariya; Kazuhisa Nagata, Okazaki, both of Japan

[73] Assignee: Aisin Seiki Kabushiki Kaisha, Kariya, Japan

[21] Appl. No.: 725,816

[22] Filed: Jul. 9, 1991

[30] Foreign Application Priority Data

Jul. 10, 1990 [JP] Japan .................. 2-73707

[51] Int. Cl.5 ................... B60J 7/00
[52] U.S. Cl. .................. 296/214; 296/223; 49/65
[58] Field of Search ............. 296/214, 220, 223; 49/65

[56] References Cited

U.S. PATENT DOCUMENTS

| | | | |
|---|---|---|---|
| 4,274,672 | 6/1981 | Kuroda | 296/220 X |
| 4,671,564 | 6/1987 | Sumida et al. | 296/214 |
| 4,872,722 | 10/1989 | Farmont | 296/214 |
| 4,981,290 | 1/1991 | Huyer | 296/214 |

FOREIGN PATENT DOCUMENTS

| | | | |
|---|---|---|---|
| 3338372 | 4/1984 | Fed. Rep. of Germany | 296/214 |
| 3536184 | 11/1986 | Fed. Rep. of Germany | 296/220 |
| 3825192 | 2/1990 | Fed. Rep. of Germany | 296/214 |
| 3904486 | 3/1990 | Fed. Rep. of Germany | 296/214 |
| 3839577 | 5/1990 | Fed. Rep. of Germany | 296/214 |
| 3839578 | 5/1990 | Fed. Rep. of Germany | 296/214 |
| 59-81220 | 5/1984 | Japan . | |
| 0226325 | 10/1986 | Japan | 296/214 |
| 0028722 | 2/1988 | Japan | 296/214 |
| 0141327 | 5/1990 | Japan | 296/214 |

*Primary Examiner*—Dennis H. Pedder
*Attorney, Agent, or Firm*—Finnegan, Henderson, Farabow, Garrett & Dunner

[57] ABSTRACT

A sun roof device includes a transparent roof panel rotatably disposed on the vehicle's roof, sunshade panels laterally slidably disposed below the roof panel so as to shade light going into the vehicle through the roof panel and so as to permit lighting of the inside of the vehicle at a retracted position not below the roof panel, a driving mechanism for opening and closing of the roof panel and a linkage mechanism for linking the sunshade panel to the driving mechanism.

3 Claims, 4 Drawing Sheets

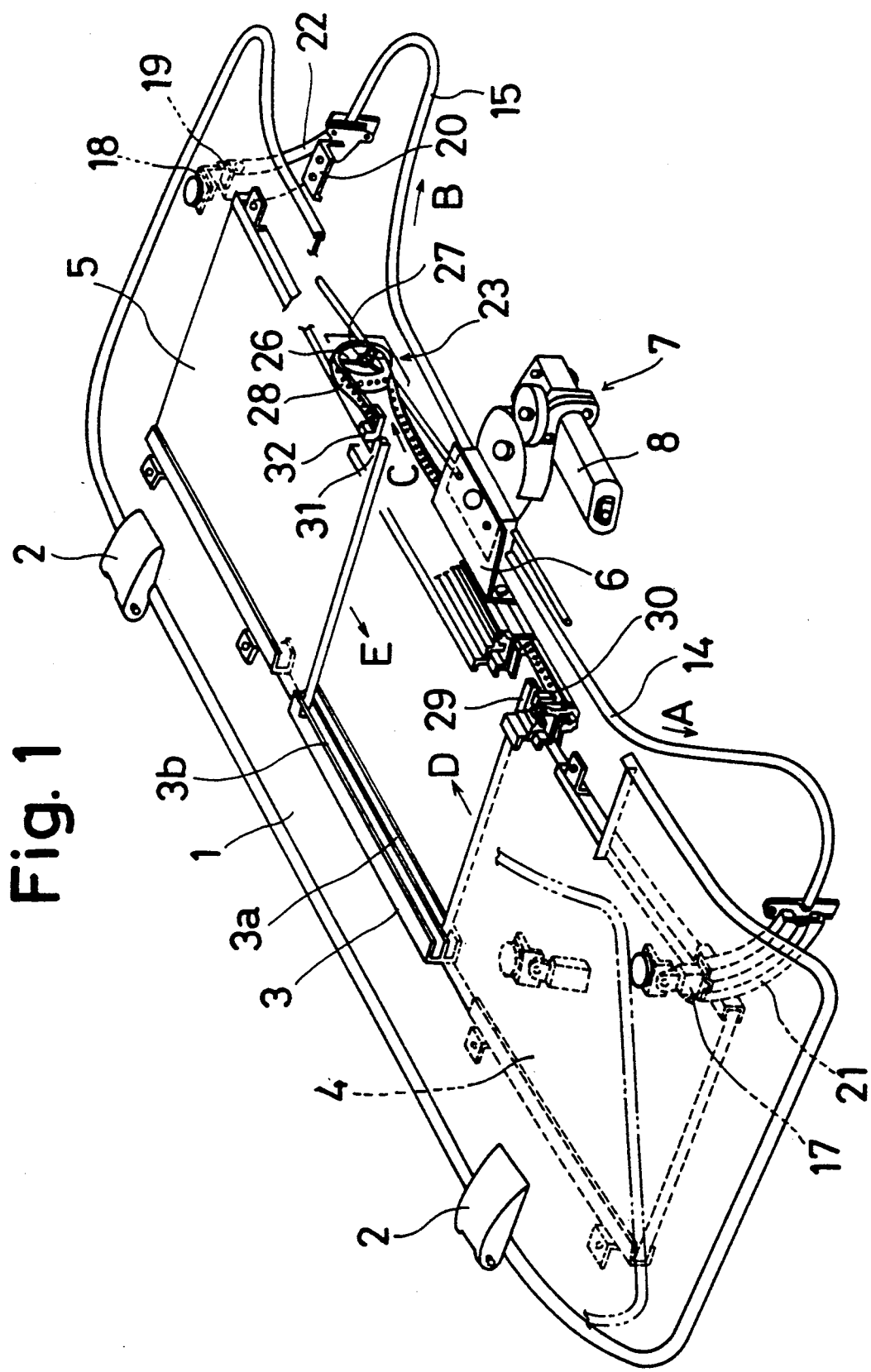

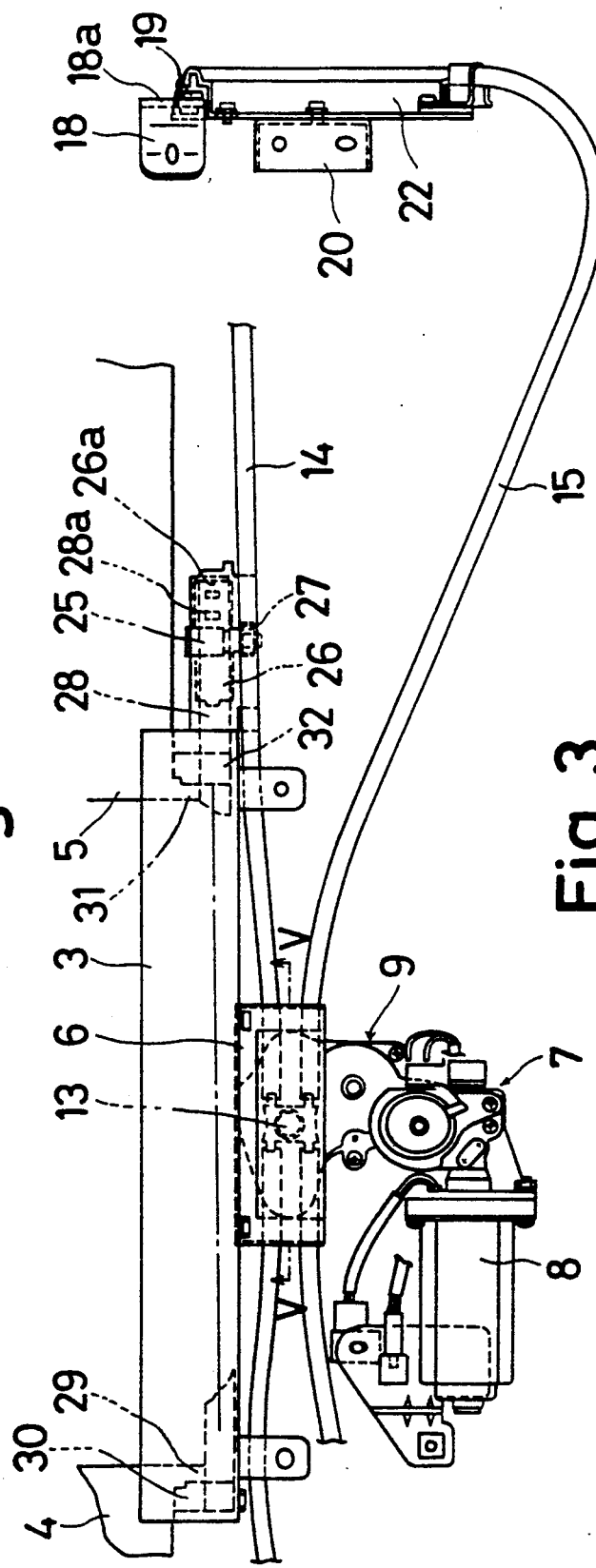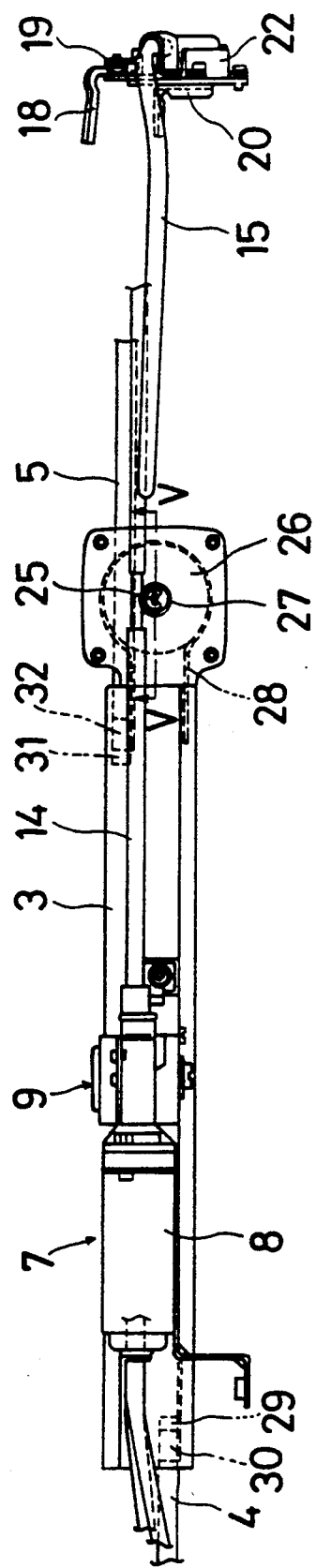

SUN ROOF DEVICE

BACKGROUND OF THE INVENTION

1. Field of the Invention

The present invention relates to a sun roof device, and more particularly to a sun roof device in which the open and close operation of an exterior roof panel is is coordinated automatically with sliding operation of an interior sunshade panel.

2. Description of the Prior Art

A conventional sun roof device of this kind is disclosed, for example, in Japanese patent application laid-open publication No. 59(1984)-81220 published on May 10, 1984. This conventional sun roof device includes an opening in a vehicle roof, a transparent roof panel disposed on the vehicle roof which is tiltable for opening and closing the roof opening, a sunshade panel slidably disposed at inside of the roof panel under the transparent roof panel so as to shade light passing into the vehicle through the transparent roof panel at a position of overlap with the transparent roof panel and so as to permit illumination of the inside of the vehicle at a position displaced from the roof transparent panel, and a driving mechanism for acting to open and close the transparent roof panel.

In the above conventional sun roof device, however, since the tilt operation of the roof panel and the sliding operation of the sunshade panel are in different directions relative to each other, it is difficult to link with the both operations. Therefore, the sunshade panel is moved only by a manual operation of a user independent of the tilt operation of the roof panel. As a result, the sunshade panel may be moved by a mistake of the user (for example, when the user forgot to operate the sunshade panel and so on) when the roof panel is opened.

SUMMARY OF THE INVENTION

It is, therefore, an object of the present invention to provide an improved sun roof device which overcomes a drawback of the prior art.

It is another object of the present invention to provide an improved sun roof device which can link the opening operation of the roof panel to the movement of the sunshade panel with simple structures.

In order to achieve these objects, there is provided an improved sun roof device includes a transparent roof panel disposed on the vehicle's roof to open and close an opening is formed in a vehicle roof, a sunshade panel slidably disposed at inside of the roof panel so as to shade light going into the vehicle through the roof panel at a position of overlap with to the roof panel and so as to permit the lighting of the inside of the vehicle at a position displaced from the transparent roof panel, a driving mechanism for acting to open and close the transparent roof panel and a linkage means for linking the sunshade panel to the driving mechanism.

BRIEF DESCRIPTION OF THE DRAWINGS

Additional objects and advantages of the present invention will become more apparent from the following detailed description of preferred embodiment thereof when considered with reference to the attached drawings, in which:

FIG. 1 is a perspective view of an embodiment of a sun roof device in accordance with the present invention;

FIG. 2 is a partially lower elevational view of FIG. 1;

FIG. 3 is a elevational view of FIG. 1;

DESCRIPTION OF THE PREFERRED EMBODIMENTS

Figure 4:
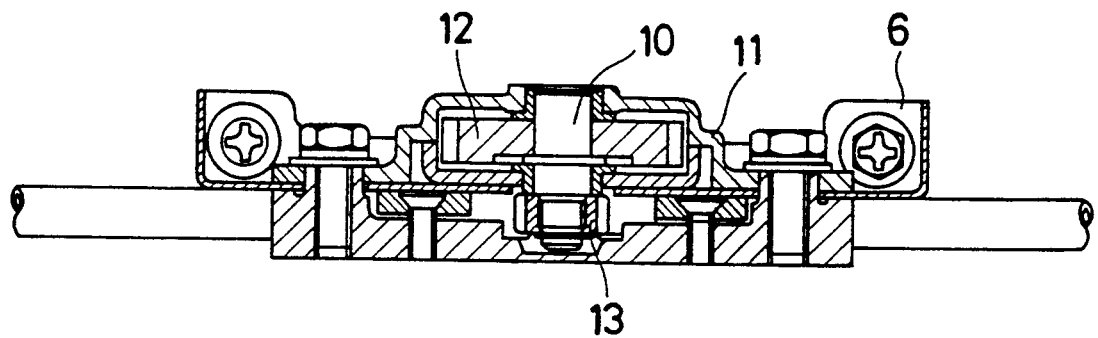
FIG. 4 is a sectional view taken substantially along the line IV—IV of FIG. 2.
Figure 5:
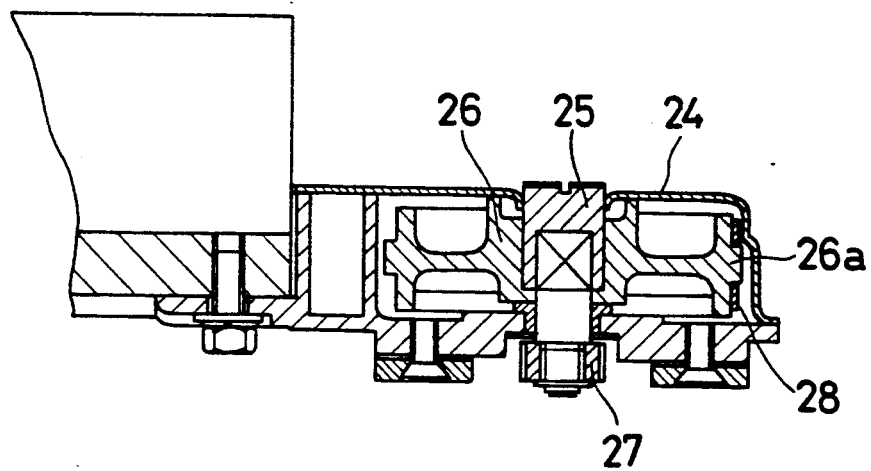
FIG. 5 is a sectional view taken substantially along the line V—V of FIG. 3.

A sun roof device constituted in accordance with a preferred embodiment of the present invention will be described with reference to the drawings.

Referring to FIG. 1, two first openings (not shown) are separately formed on the right and left side of an inner body panel of a vehicle roof (not shown). In an outer body panel of the vehicle roof, a second opening (not shown) is formed so as to overlie both the first openings of the inner panels. A transparent roof panel 1 is disposed in the second opening so as to pivot on hinge members 2 which are located on a front end of the roof panel 1. Thus, the second opening may be opened and closed by the roof panel 1. In the approximate center portions of the front end and of the rear of the second opening, guide rails 3 having two parallel grooves 3a, 3b are disposed between the inner and outer body panels. The grooves 3a, 3b are formed so as to be in parallel with the first openings. The groove 3a is extended to the left first opening and the groove 3b is extended to the right first opening. Sunshade panels 4, 5 are slidably disposed in the grooves 3a, 3b of the guide rails 3, respectively. Thus, the sunshade panels 4, 5 can be slid so as to open and close the first openings, respectively. Namely, the sunshade panels 4, 5 shade a light going into the vehicle through the roof panel 1 at a position of overlap with the roof panel 1 and permit lighting of the inside of the vehicle at a position displaced from the roof panel 1.

A driving mechanism 7 is disposed on the rear guide rail 3 via a bracket 6.

Figure 6:
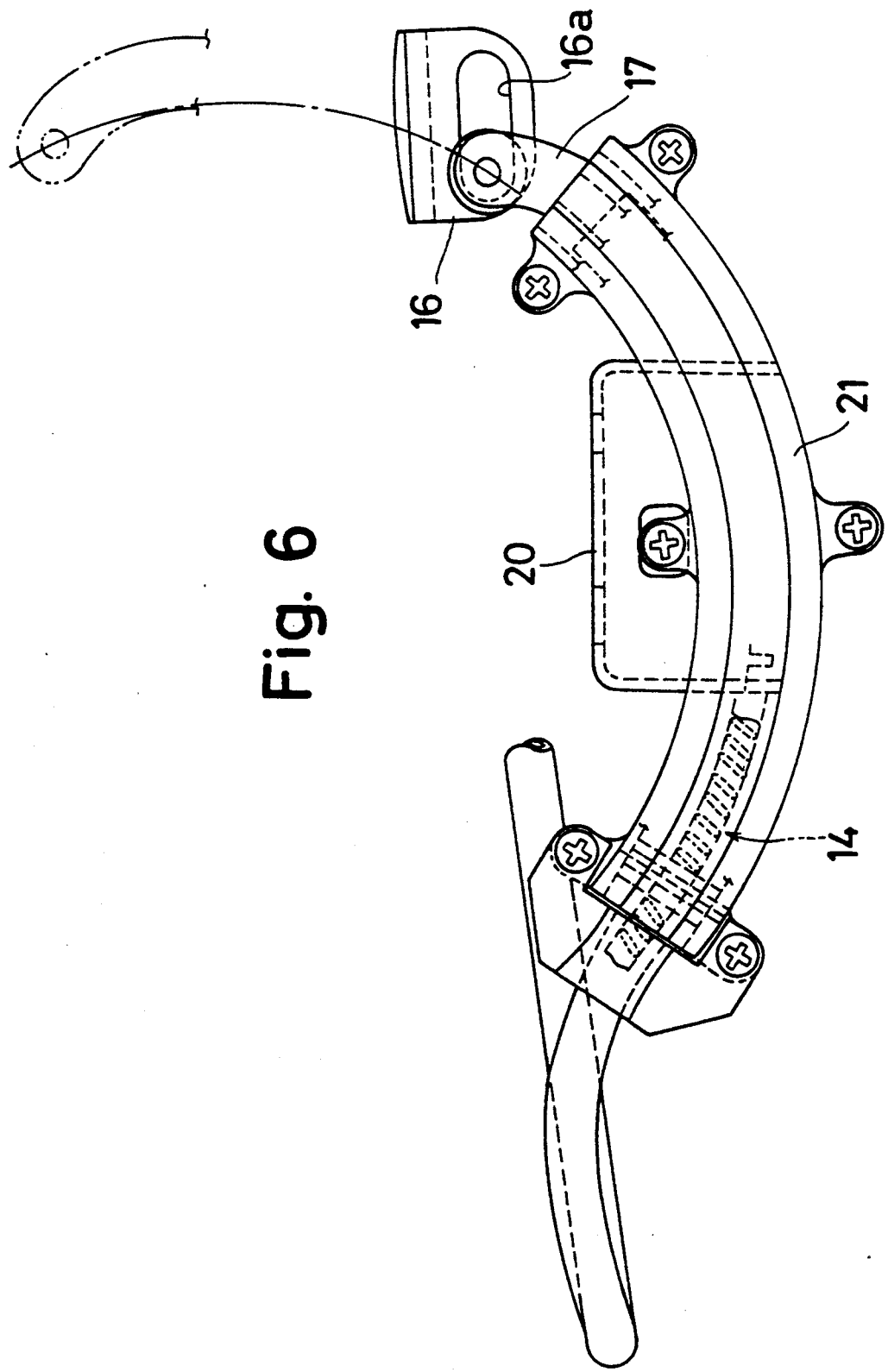
FIG. 6 is a enlarged detail of an open and close mechanism of a roof panel of an embodiment of a sun roof device in accordance with the present invention.

As shown in FIG. 1 to FIG. 4, a shaft 10 is connected with a motor 8 via a gear mechanism 9 so as to be rotated by a driving force of the motor 8. The shaft 10 is supported in a housing 11 at its both ends so as to be able to rotate. At one end of the shaft 10, a gear 12, which is engaged with a last gear of the gear mechanism 9, is fixed to the shaft 10 so as to rotate as one body. At other end of the shaft 10 a gear 13 is fixed to the shaft 10 so as to rotate as one body. Two gear cables 14, 15 which are slidably disposed in separate tubes are oppositely engaged with the gear 13. As shown in FIG. 6, an one end of the gear cable 14 is connected with a shoe 17 which is connected with a bracket 16 via a long hole 16a. The bracket 16 is connected with the left rear end of the transparent roof panel 1 as shown in FIG. 1. On the other hand, one end of the gear cable 15 is connected with a shoe 19 which is connected with a bracket 18 via a long hole 18a. The bracket 18 is connected with the right rear end of the roof panel 1 as shown in FIG. 1. The shoes 17, 19 are formed in a shape such as a circular-arc, respectively. The shoes 17, 19 are disposed between the outer body panel (not shown) and the inner body panel (not shown) and are slidably supported in guide rails 21, 22 which are fixed to the outer body panel via brackets 20, respectively.

A linkage mechanism 23 is fixed to the rear guide rail 3. The linkage mechanism 23 corresponds to a linkage means of the present invention.

As shown in FIG. 1 to FIG. 5, a shaft 25 is slidably supported in a housing 24. At the side of an one end of the shaft 25, a pulley 26 is fixed to the shaft 25 so as to rotate as one body. Plural projections 26a are formed on an outer circumferential surface of the pulley 26 at a predetermined spaces. On the other hand, at one end of the shaft 25, a gear 27, which is engaged with the gear cable 14 is fixed to the shaft 25 so as to rotate as one body. A belt 28 having plural engaging holes 28a, which are engaged with the projections 26a, is connected with the pulley 26. The belt 28 is guided by an inner surface of the housing 24 so as not to disengage the engagement between the projections 26a and the engaging holes 28a. At an one end of the belt 28, a contacting member 30, which is able to contact with a left side surface of a contacting piece 29 formed on the sunshade panel 4, is fixed thereon. On the other hand, at the other end of the belt 28, a contacting member 32 which is able to contact with a right side surface of a contacting piece 31 formed on the sunshade panel 5 is fixed thereon. The belt 28 and the contacting members 31, 32 are slidably supported in the rear guide rail 3.

The above-described embodiment of the sun roof device operates as follows. In the condition under which the roof panel 1 closes the second opening (not shown) as shown in solid line in FIG. 1, and the sunshade panels 4, 5 close the first openings (not shown) underlying the roof panel 1, when the motor 8 is turned on, the shaft 10 is rotated by the motor 8 via the gear mechanism 9 and the gear 12. As a result, the gear cables 14, 15 are slid in A, B directions by the rotation of the shaft 10 via the gear 13 in FIG. 1, respectively. Accordingly, the shoes 17, 19 are upwardly slid and the roof panel 1 is tilted as shown by a point chain line in FIG. 1. Namely, the roof panel 1 is positioned in its opening position which opens the second opening. On the other hand, the shaft 25 is rotated by the sliding movement of the gear cable 14 via the gear 27. As a result, the pulley 26 is rotated by the rotation of the shaft 25 and the belt 28 is moved in the C direction by the engagement between the projections 26a and the engaging holes 28a in FIG. 1. Accordingly, the contacting members 30, 32 are contacted with the left side surface of the contacting piece 29 and the right side surface of the contacting piece 30 by the movement of the belt 28, respectively and the sunshade panels 4, 5 are moved in the D, E directions in FIG. 1. Namely, the sunshade panels 4, 5 are displaced to a retracted position with respect to the roof panel 1 and open the first openings in the inner roof body panel (not shown).

As mentioned above, when the roof panel 1 is opened from a condition that the roof panel 1 and the sunshade panels 4, 5 are closed, the sunshade panels 4, 5 are automatically opened in response to the opening operation of the roof panel 1.

Furthermore, since the sunshade panels 4, 5 are opened by the driving force due to the sliding movement of the gear cable 14, namely by the driving force of the driving mechanism 7, the opening operation of the sunshade panels 4, 5 are simultaneously acted with the opening operation of the roof panel 1 and it is able to obtain the open feeling in a moment. Furthermore, since the sunshade panels 4, 5 are opened by the existing driving mechanism 7 for the roof panel 1, it is unnecessary to provide another driving force source for opening the sunshade panel 4, 5. Therefore, it is able to prevent the increase of the manufacturing cost and the installing space.

Now, a closing operation which the roof panel 1 is returned from its opening position to its closing position is acted by the contrary operation with regard to the above described operation. In this case, since the belt 28 is moved toward the direction which the contacting members 30, 32 are separated from the contacting pieces 29, 31, respectively, the sunshade panels 4, 5 are not automatically retracted in response to the closing operation of the roof panel 1 and the closing operation of the sunshade panels 4, 5 are not simultaneously acted with the closing operation of the roof panel 1. Therefore, the closing operation of the sunshade panels 4, 5 is effected by the manual operation of the user and furthermore it is able to open (receive) and close the sunshade panels 4, 5 by the manual operation under the condition which the roof panel 1 is closed.

The sun roof device which can link the opening operation of the roof panel to the opening operation of the sunshade panel is already known. According to this sun roof device, the linkage mechanism is disposed between the roof panel and the sunshade panel and the driving force of the driving force source for the roof panel is transmitted to the sunshade panel via the roof panel. In this art, however, it is desirable to apply only to the sun roof device operation in which the opening operation of the roof panel and the opening operation of the sunshade panel act in the same direction. It is not desirable to operate the sun roof device in a manner so that the opening and closing operation of the roof panel acts in both directions with regard to the direction of the opening operation of the sunshade panel. On the contrary, according to the present invention, in the sun roof device which the open and close operation of the roof panel acts in a different direction with regard to the direction of the opening operation of the sunshade panel, it is able to link the opening operation of the roof panel to the opening operation of the sunshade panel and it is able to obtain the above described advantages.

The principles, preferred embodiment of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in appended claims.

What is claimed is:

1. A sunroof assembly for an opening in a vehicle roof, said assembly comprising:
an exterior transparent panel pivotable about a lateral vehicle axis for movement between open and closed positions;
a pair of interior sunshade panels located under said exterior transparent panel and movable in directions parallel to said axis between a light shading position, in which said sunshade panels are spaced from each other, and a retracted position in which said sunshade panels are substantially superposed;

means for driving said exterior transparent panel between said open and closed positions; and linkage means for moving said interior sunshade panels from said light shading position to said retracted position upon operation of said driving means to move said exterior transparent panel to said open position.

2. A sun roof assembly as recited in claim 1, wherein the linkage means changes the direction of a part of the driving force transmitted from the driving means to the transparent roof panel and transmits another part of the same driving force to the sunshade panels.

3. A sun roof assembly as recited in claim 2, wherein the sunshade panels are movable independently of said linkage means to said retracted position by manual operation when the transparent roof panel is in said closed position.

* * * * *